March 3, 1953     G. L. STEVENS     2,630,358
PISTON RING GROOVE SPACER
Filed July 15, 1950
FIG. 5.     FIG. 1.     FIG. 3.
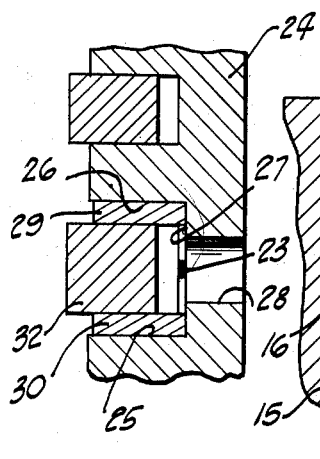
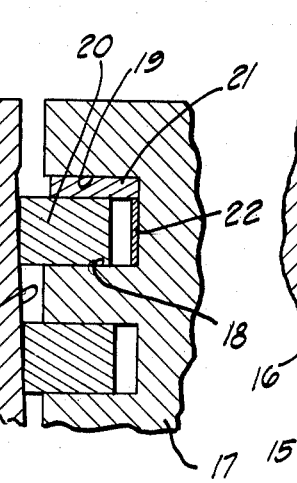
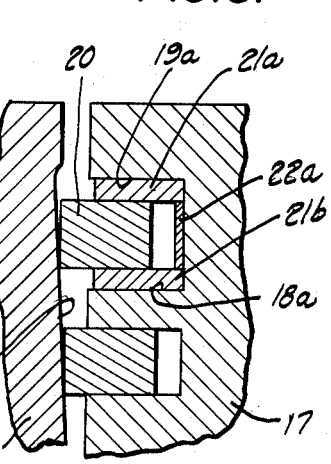
FIG. 2.     FIG. 4.
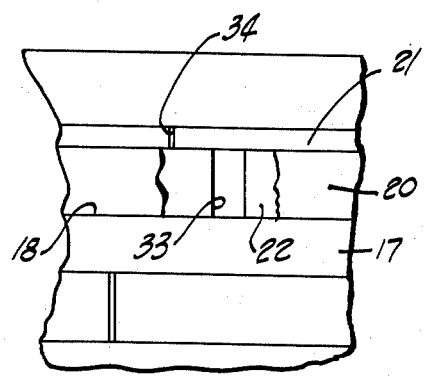
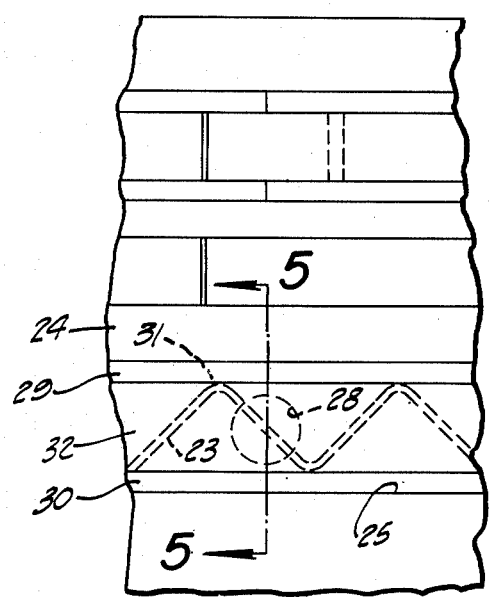
FIG. 6.
FIG. 7.
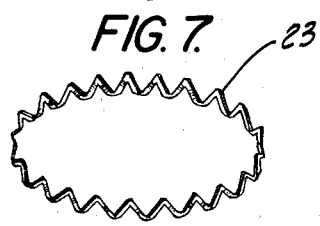
FIG. 8.
INVENTOR.
Guy L. Stevens
BY
ATTORNEY.

Patented Mar. 3, 1953

2,630,358

UNITED STATES PATENT OFFICE 2,630,358

PISTON RING GROOVE SPACER

Guy L. Stevens, Detroit, Mich., assignor to Hastings Manufacturing Company, Hastings, Mich., a corporation of Michigan Application July 15, 1950, Serial No. 174,060

8 Claims. (Cl. 309—44)

My invention relates to a new and useful improvement in a piston ring groove spacer. In the use of pistons having sealing rings positioned in grooves therein, the upper and lower faces of the groove become worn so that efficient functioning of the piston ring is no longer possible. Under such conditions, it is common practice to reface the ring groove so that the upper and lower faces as well as the bottom face of the groove are brought back to their normal condition. In this operation, the groove of course becomes widened and it is necessary to place a spacing member or ring in the groove to engage one side of the piston ring so that the space for reception of the piston ring is again restored to its normal dimensions. When the engine is operating and the piston is reciprocating, the ring will move axially from the bottom side of the groove to the top side and vice versa as there is always a slight play at opposite sides of the piston ring. The spacing rings commonly used are such that they move with the piston ring in these movements and because of the additional body moving the efficiency of the piston ring itself is impaired and its movements from side to side of the groove become considerably slower.

It is an object of the present invention to provide a piston ring spacer so constructed and arranged in the piston ring groove that this spacer moves with the piston so that the ring is left free in its movement and it becomes possible for the ring to move by itself.

Another object of the invention is to provide a spacing ring of this type together with an engagement body so that the spacing ring is firmly held in engagement with the wall of the groove.

Another object of the invention is the provision of a spacing ring and engagement body so constructed and arranged that the groove itself may be lined with steel or material harder than the piston so as to prolong the life of the piston and prevent wear on the piston at its grooves.

Another object of the invention is the provision of a spacing ring so constructed and arranged that it may be mounted in an oil groove of a piston without interfering with the normal flow of lubrication.

Another object of the invention is the provision of an engagement body mounted in the ring groove and engaging spacer ring mounted therein so that the spacer ring is prevented from canting or tilting.

Another object of the invention is the provision of a spacing ring of this class so constructed and mounted in the ring groove as to afford a better contact with the wall of the cylinder especially in a tapered cylinder.

Another object of the invention is the provision of a spacing ring formed from steel so as to reduce the carbonizing which commonly occurs on aluminum pistons.

Another object of the invention is the provision of a spacing ring so arranged and constructed that it may be mounted in an oil groove of a ring without impairing the flow of lubricant and at the same time permitting the use of a narrower oil groove ring.

Other objects will appear hereinafter.

It is recognized that various modifications and changes may be made in the detail of structure illustrated and it is intended that the present disclosure shall be but the preferred embodiment of the invention.

Forming a part of this application are drawings, in which,

Fig. 1 is a fragmentary sectional view through a cylinder showing the invention applied, Fig. 2 is a fragmentary side elevational view of a piston ring showing the invention applied with parts broken away, Fig. 3 is a fragmentary sectional view through a piston showing the invention applied with a spacing ring positioned at the top and bottom of the ring groove, Fig. 4 is a fragmentary elevational view of a piston with the invention applied to an oil ring groove, Fig. 5 is a fragmentary sectional view taken on line 5—5 of Fig. 4, Fig. 6 is a perspective view of the engaging or supporting ring used in the invention, Fig. 7 is a perspective view of the engaging or supporting ring used in the oil ring groove, Fig. 8 is a fragmentary sectional view illustrating the overlap of the supporting ring.

In Fig. 1, I have illustrated a fragment of an engine block 15 in which is formed a tapered cylinder 16 in which is adapted to reciprocate a piston 17. Formed in this piston are ring grooves having a bottom face 18 and a top face or wall 19. In Fig. 1 this ring groove has been shown regrooved so that the walls 18 and 19 do not show any wear, the worn portions of the original walls having been removed in the regrooving process. Seated in the groove is a piston ring 20 and engaging the upper face of this piston ring is a spacing ring 21. This spacing ring is of such thickness that it compensates for the material removed from the original groove during the regrooving operation so that the regrooved groove is of proper size, when the spacing ring 21 is positioned therein, to afford the proper space for reception of the original piston ring 20. This spacing ring 21 is a split ring of resilient metal, preferably steel, and is adapted to snap into position in the groove. A supporting ring 22 formed from resilient material and preferably steel is provided and of such a size that when it snaps into the piston ring groove, it will snugly engage the bottom wall of the groove. At one of its edges it will also engage one face of the groove and at its other edge, it will engage a face of the spacing ring 21 thus serving as a support for the spacing ring and maintaining it in close engagement with the face 19 of the groove so that this spacing ring is securely held in fixed relation to the piston and is prevented from movement relatively thereto. Consequently when the piston ring moves in the groove it will move by itself and there will be no concurrent movement therewith of the spacing ring 21. Since the spacing ring 21 is held in fixed relation to the piston 17 the spacing ring 21 of course cannot tilt relative to the axis of the piston.

In Fig. 3, I have indicated a ring groove having the faces 19a and 18a which are the finished faces of the regrooved groove. In this groove I show the piston ring 20 adapted for engagement with the tapered bore 16 formed in the engine block 15. In Fig. 3, I have shown a spacing ring 21a engaging the face 19a and a similar spacing ring 21b engaging the face 18a of the piston 17. A supporting ring 22a engages at its inner face the bottom of the groove and at its edges it engages the spacing rings 21a and 21b.

With this construction it becomes possible to widen the groove of the piston to a greater degree. Since these spacing rings and the supporting ring 22 are formed from hard material such as steel, I have thus provided a groove lined with steel or other suitable wear resisting material while at the same time, these spacing rings and the supporting ring move with and are actually a part of the piston itself, thus leaving the piston ring free in its own individual movements.

In Fig. 7, I have indicated a supporting ring 23 which is formed sinuous with the curves of the ring extending axially. In use this ring is snapped into the groove in the same manner as the ring 22.

In Fig. 4 and Fig. 5, I have shown a piston 24 having an oil ring groove with a lower face 25 and an upper face 26 and a bottom 27. Formed through the piston so as to communicate with the ring groove is an opening 28 through which lubricant may flow so that the groove is thus termed an oil ring groove. This groove has been regrooved and positioned in the groove are the spacing rings 29 and 30 supported by the supporting ring 23. As shown in Fig. 4, this engagement is at the apexes 31 of the ring 23. This ring 23 therefore, while engaging the spacing rings 29 and 30 at spaced apart points, serves to retain these rings in engagement with the faces 25 and 26 so that they become a part of the piston and move with it. By forming this supporting ring 23 sinuous, in the manner described, the free flow of lubricant through the opening 28 is not interfered with, thus permitting the proper lubrication to flow to the piston ring 32.

As shown in Fig. 8, the ring 22 overlaps at its ends when closed and when snapped into position in the ring groove these ends will overlap.

As shown in Fig. 2 there is a gap 33 between the ends of the supporting ring 22 and also a gap 34 between the ends of the spacing ring 21. In Fig. 8 I have shown the ends of the ring 22 overlapping as are likewise the ends of the spacing ring 21.

It will be noted that the spacing rings are of less width than the depth of the groove and, of course, the spacing in which the piston ring 20 or the piston ring 32 is positioned must be slightly wider than the thickness of the piston ring so that the piston ring may move inwardly and outwardly. In this inward and outward movement of the piston ring, the movement is relatively to the spacers as the spacers remain stationary on the piston.

Experience has shown that using a spacing ring construction as described, a more efficient operation is accomplished.

It is believed obvious that the spacer described herein may be used on new pistons, thus making it possible to use a narrower piston ring and preventing top groove wear which makes possible longer service life for the piston rings and more efficient operation.

What I claim is:

1. A piston ring groove spacer adapted for use with a piston having a ring groove formed therein for reception of a piston ring, said groove being provided with a bottom side face and a top side face, and a bottom face, a split resilient spacing ring positioned in said groove and engaging one of said side faces and in contracting supported relation to the bottom of the groove; and a supporting ring positioned in said groove in supported contracting relation to the bottom thereof and engaging at its edges with the bottom face of said groove and a face of the spacing ring for retaining the spacing ring in fixed relation to the piston.

2. A piston ring groove spacer adapted for use with a piston having a ring groove formed therein for reception of a piston ring, said groove being wider than the width of said piston ring and provided with a bottom side wall and a top side wall and a bottom face, a split resilient spacing ring positioned in said groove and engaging at its inner edge the bottom face of the groove and at one of its side faces with a side wall of the groove; and a split resilient supporting ring positioned in said groove and in contracting supported relation to the bottom thereof and engaging at one of its edges a side wall of the groove and at its opposite edge the opposite face of the spacing ring for retaining said spacing ring in fixed relation to said piston.

3. A piston ring groove spacer adapted for use with a piston having a ring groove formed therein for reception of a piston ring, said groove being provided with a top side wall and a bottom side wall and a bottom face, a split resilient spacing ring positioned in said groove and engaging at its inner edge with the bottom wall of said groove and at one of its faces with a side wall of said groove; and a resilient ring positioned in said groove and formed sinuous, axially, and engaging, at spaced apart points, with a side wall of said groove and with the opposite face of said spacing ring for retaining said spacing ring in engagement with the engaged side wall of said groove.

4. A piston ring groove spacer adapted for use with a piston having a ring groove formed therein for reception of a piston ring, said groove being provided with a top side wall and a bottom side wall and a bottom face, a resilient spacing ring positioned in said groove and engaging at its inner edge with the bottom wall of said groove and at one of its faces with a side wall of said groove; and a resilient ring positioned in said groove and formed sinuous, axially, and engaging the spaced apart points with a side wall of said groove and with the opposite face of said spacing ring for retaining said spacing ring in engagement with said side wall of said groove, said supporting ring engaging at its inner edge the bottom wall of said groove.

5. A piston ring groove spacer adapted for use with a piston having a ring groove formed therein for reception of a piston ring, said groove having a bottom side wall and a top side wall and a bottom face, a pair of resilient metallic spacing rings positioned in said groove, each of said rings engaging at one of its faces with a side wall of the groove; and a resilient metallic supporting ring positioned in said groove and engaging at its opposite edges with opposed faces of said spacing rings for retaining said spacing rings in fixed relation to the piston.

6. A piston ring groove spacer adapted for use with a piston having a ring groove formed therein for reception of a piston ring, said groove being provided with a bottom side wall, a top side wall and a bottom face, a pair of resilient metallic spacing rings positioned in said groove each of said rings engaging at its inner edge with the bottom of the groove and at one of its faces with a side wall of the groove to provide spaced apart opposed faces on the spacing rings; and a resilient metallic supporting ring positioned in said groove and engaging at its inner side with the bottom of said groove and at its edges with the opposed faces of said rings for retaining said rings in fixed relation to the piston.

7. A piston ring groove spacer adapted for use with a piston having a ring groove formed therein for reception of a piston ring, said groove being provided with a bottom side wall and a top side wall and a bottom face, and said bottom face being wider than the width of said piston ring, a spacing ring positioned in said groove and engaging at its inner edge the bottom face of the groove and at one of its side faces with a side wall of the groove; and a supporting ring positioned in said groove and engaging at one of its edges a side wall of the groove and at its opposite edge the opposite face of the spacing ring and at its inner edge with the bottom of said groove for retaining said spacing ring in fixed relation to said piston, the width of said spacing ring being less than the depth of said groove.

8. A piston ring groove spacer adapted for use with a piston having a ring groove formed therein for reception of a piston ring, said groove provided with a bottom side wall, a top side wall and a bottom face, a pair of resilient metallic spacing rings positioned in said groove each of said rings engaging at its inner edge with the bottom of the groove and at one of its faces with a side wall of the groove to provide spaced apart opposed faces on the spacing rings; and a resilient metallic supporting ring positioned in said groove and engaging at its inner side with the bottom of said groove and at its edges with the opposed faces of said rings for retaining said rings in fixed relation to the piston, the depth of said groove being greater than the width of said spacing rings.

GUY L. STEVENS.

REFERENCES CITED

The following references are of record in the file of this patent:

UNITED STATES PATENTS

| Number | Name | Date |
| --- | --- | --- |
| 1,529,052 | Anderson | Mar. 10, 1925 |
| 2,197,983 | Phillips | Apr. 23, 1940 |
| 2,297,104 | Johnson | Sept. 29, 1942 |
| 2,302,959 | Johnson | Nov. 24, 1942 |
| 2,369,263 | Teetor | Feb. 13, 1945 |

FOREIGN PATENTS

| Number | Country | Date |
| --- | --- | --- |
| 539,038 | Great Britain | Aug. 26, 1941 |